US012680269B2

(12) United States Patent
Kim

(10) Patent No.: US 12,680,269 B2
(45) Date of Patent: Jul. 14, 2026

(54) AGRICULTURAL WORK VEHICLE

(71) Applicant: LS MTRON LTD., Anyang-si (KR)

(72) Inventor: Jiwon Kim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 336 days.

(21) Appl. No.: 18/578,228

(22) PCT Filed: Jul. 14, 2022

(86) PCT No.: PCT/KR2022/010268
§ 371 (c)(1),
(2) Date: Jan. 10, 2024

(87) PCT Pub. No.: WO2023/287215
PCT Pub. Date: Jan. 19, 2023

(65) Prior Publication Data
US 2024/0301655 A1 Sep. 12, 2024

(30) Foreign Application Priority Data

Jul. 15, 2021 (KR) ........................ 10-2021-0092847
Jul. 11, 2022 (KR) ........................ 10-2022-0085038

(51) Int. Cl.
*E02F 9/16* (2006.01)
*B60J 1/18* (2006.01)
(Continued)

(52) U.S. Cl.
CPC ............. *E02F 9/163* (2013.01); *B60J 1/1884* (2013.01); *B62D 49/0692* (2013.01); *E02F 3/32* (2013.01);
(Continued)

(58) Field of Classification Search
CPC ..... A01D 67/02; B60J 1/00; B60J 1/18; B60J 1/1884; B60J 5/12; B62D 33/06;
(Continued)

(56) References Cited

U.S. PATENT DOCUMENTS 4,036,077 A * 7/1977 Akiyama .............. E02F 9/2004
74/519
4,081,051 A * 3/1978 Logsdon ................ B60N 2/203
296/65.09
(Continued)

FOREIGN PATENT DOCUMENTS

DE 4404415 A1 * 8/1995 ......... B62D 33/0617
EP 0494402 A2 * 7/1992 ......... B62D 33/0617
(Continued)

OTHER PUBLICATIONS

DE 4404415 A1 (Year: 1995).*
(Continued)

*Primary Examiner* — Lori Lyjak
(74) *Attorney, Agent, or Firm* — K&L Gates LLP

(57) ABSTRACT

The present disclosure relates to an agricultural work vehicle, including: a vehicle body; and a cabin coupled to the vehicle body and provided with a driver's seat therein; wherein the cabin includes: a lower frame configured to form the lower part of the cabin; an upper frame configured to form the upper part of the cabin; a lower window selectively and detachably coupled to the rear of the lower frame and configured to be selectively opened and closed; and an upper window hinged to the rear of the upper frame on one side thereof and openably coupled to the upper frame.

12 Claims, 7 Drawing Sheets

(51) Int. Cl.

| | | |
|---|---|---|
| *B62D 49/06* | (2006.01) | |
| *E02F 3/32* | (2006.01) | |
| *E02F 9/20* | (2006.01) | |
| *E05F 15/53* | (2015.01) | |

(52) U.S. Cl.
CPC ............ *E02F 9/2004* (2013.01); *E05F 15/53* (2015.01); *E05Y 2900/518* (2013.01); *E05Y 2900/55* (2013.01)

(58) Field of Classification Search
CPC ........ B62D 49/0692; E02F 3/32; E02F 9/163; E02F 9/2004; E02F 15/53; E05Y 2900/518; E05Y 2900/55; E06B 3/36
See application file for complete search history.

(56) References Cited

U.S. PATENT DOCUMENTS

| | | | | |
|---|---|---|---|---|
| 4,443,035 A | * | 4/1984 | Saemann | ........... B62D 33/0617 |
| | | | | 160/183 |
| 4,518,195 A | * | 5/1985 | Tindall | ................... B60J 1/1884 |
| | | | | 296/146.16 |

FOREIGN PATENT DOCUMENTS

| | | | | | |
|---|---|---|---|---|---|
| ES | 271961 U | * | 4/1984 | ......... | B62D 33/0617 |
| GB | 1513025 A | * | 6/1978 | ............ | B60J 1/1884 |
| JP | 58191626 A | * | 11/1983 | ............ | B60J 1/1884 |
| JP | 3704900 B2 | * | 10/2005 | ............ | B60J 5/0487 |
| JP | 2006320233 A | | 11/2006 | | |
| KR | 20100003125 U | | 3/2010 | | |
| KR | 20120050893 A | | 5/2012 | | |
| KR | 20120134786 A | | 12/2012 | | |
| KR | 20150035357 A | | 4/2015 | | |

OTHER PUBLICATIONS

JP 2002347437 A (Year: 2002).*
KR 20100003125 U (Year: 2010).*
International Search Report for related International Application No. PCT/KR2022/010268; action dated Jan. 25, 2023; (3 pages).
Written Opinion for related International Application No. PCT/KR2022/010268; action dated Jan. 25, 2023; (5 pages).

* cited by examiner

AGRICULTURAL WORK VEHICLE

CROSS-REFERENCE TO RELATED APPLICATION

This application is a National Stage of International Application No. PCT/KR2022/010268 filed on Jul. 14, 2022, which claims priority to and the benefit of Korean Patent Application No. 10-2021-0092847, filed on Jul. 15, 2021, and Korean Patent Application No. 10-2022-0085038, filed Jul. 11, 2022, the disclosures of which are incorporated herein by reference in its entirety.

FIELD

The present disclosure relates to an agricultural work vehicle that is used to grow crops required for human life by using land.

BACKGROUND

Agricultural work vehicles are used to grow crops required for human life by using land. For example, combines, tractors, rice transplanters, etc. correspond to agricultural work vehicles. Combines are used to cut and thresh crops such as rice, barley, wheat, soybeans, etc. Tractors perform the work required to grow crops by using traction force. Rice transplanters perform the work of transplanting seedlings, grown in seedbeds or seedling boxes, into rice fields.

Furthermore, agricultural work vehicles can perform various tasks through work machines. For example, a work machine such as a backhoe may be mounted on the rear of an agricultural work vehicle. A backhoe is used to perform digging work, excavation work, etc. at a work site.

Such agricultural work vehicles may be equipped with cabins to protect operators from rain or cold waves. A window may be openably coupled to such a cabin. The window may be implemented to close the cabin to protect an operator when weather conditions correspond to rainy weather or cold waves. In contrast, the window may be implemented to open the cabin when the weather conditions correspond to heat waves.

Meanwhile, in the agricultural work vehicles according to the prior art, an operation unit for operating a work machine installed at the rear of each of the agricultural work vehicles may be arranged outside the cabin. An operator may operate the operation unit after opening the window installed in the cabin. Accordingly, in order to operate the operation unit, the operator can operate the operation unit only after opening the window. In this case, the agricultural work vehicles according to the prior art have a problem in that interference with the operation unit occurs during the process of opening the window. Therefore, the agricultural work vehicles according to the prior art are implemented such that upon opening of the window, the window is opened after the position of the operation unit has been adjusted, so that a problem arises in that the process of opening the window is inconvenient.

SUMMARY

The present disclosure has been conceived to overcome the above-described problem, and is intended to provide an agricultural work vehicle that allows windows installed in a cabin to be conveniently opened or closed.

In order to overcome the above problem, the present disclosure may include the following configuration:

An agricultural work vehicle may include: a vehicle body; and a cabin coupled to the vehicle body and provided with a driver's seat therein. The cabin may include: a lower frame configured to form the lower part of the cabin; an upper frame configured to form the upper part of the cabin; a lower window selectively and detachably coupled to the rear of the lower frame and configured to be selectively opened and closed; and an upper window hinged to the rear of the upper frame on one side thereof and openably coupled to the upper frame.

According to the present disclosure, the following effect may be achieved:

The present disclosure may be implemented such that the upper window and lower window arranged toward the rear of the vehicle body are opened in different directions, so that the upper window can be opened without interference with an operation lever during the process of opening the upper window. Accordingly, in the present disclosure, the opening operation of opening the upper window and the lower window may be conveniently performed.

DETAILED DESCRIPTION

Embodiments of an agricultural work vehicle according to the present disclosure will be described in detail below with reference to the accompanying drawings.

Figure 1:
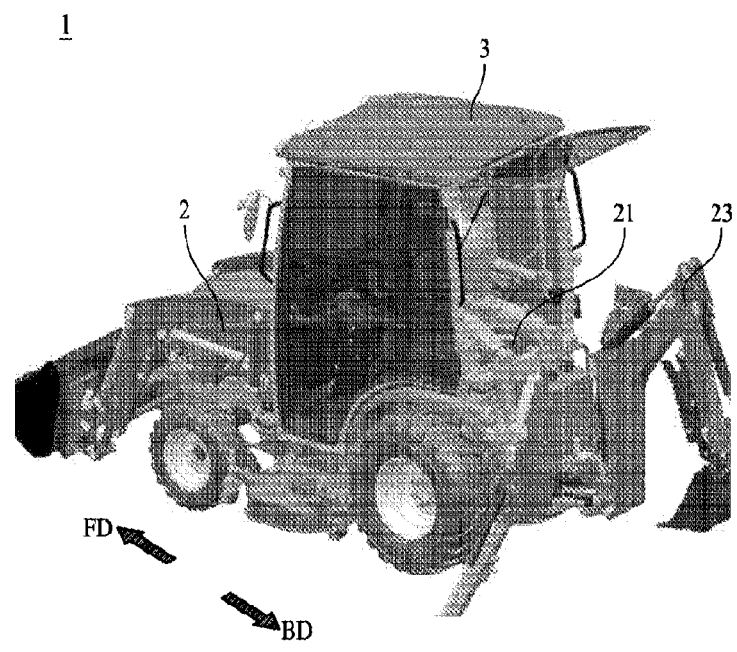
FIG. 1 is a schematic perspective view of an agricultural work vehicle according to the present disclosure.

Referring to FIG. 1, an agricultural work vehicle 1 according to the present disclosure is used to grow crops required for human life by using land. The agricultural work vehicle 1 according to the present disclosure may be a tractor, a combine, or the like.

The agricultural work vehicle 1 according to the present disclosure includes a vehicle body 2, and a cabin 3 coupled to the vehicle body 2 and provided with a driver's seat 21 therein.

The cabin 3 may include a lower frame 4 configured to form the lower part of the cabin 3, an upper frame 5 configured to form the upper part of the cabin 3, a lower window 6 selectively and detachably coupled to the rear of the lower frame 4 and configured to be selectively opened and closed, and an upper window 7 hinged to the rear of the upper frame 5 on one side thereof and configured to be openable. That is, the lower window 6 and the upper window 7 may be opened in different directions.

Accordingly, the agricultural work vehicle 1 according to the present disclosure may achieve the following operational effects.

In the agricultural work vehicle 1 according to the present disclosure, the lower window 6 and the upper window 7 may be individually implemented to open or close the cabin 3. Accordingly, the agricultural work vehicle 1 according to the present disclosure reduces interference with other members during the process of opening or closing the lower window 6 and the upper window 7, thereby enabling the operation of opening or closing the lower window 6 and the upper window 7 to be performed smoothly.

The vehicle body 2 and the cabin 3 will be described in detail below with reference to the accompanying drawings.

Referring to FIG. 1, the vehicle body 2 supports the cabin 3. As an operator sits in the driver's seat 21 and operates a steering device, an operating device, etc., the agricultural work vehicle 1 according to the present disclosure may perform predetermined tasks. An engine (not shown), a transmission (not shown), wheels, etc. may be installed in the vehicle body 2. When the driving force generated by the engine is transmitted to the wheels, the vehicle body 2 may move forward (in the direction of arrow FD) and backward (in the direction of arrow BD) as the wheels rotate. An operation lever 22 (shown in FIG. 14) may be installed at the rear of the vehicle body 2 (in the direction of arrow BD) to operate a work machine 23 such as a backhoe.

Figure 2:
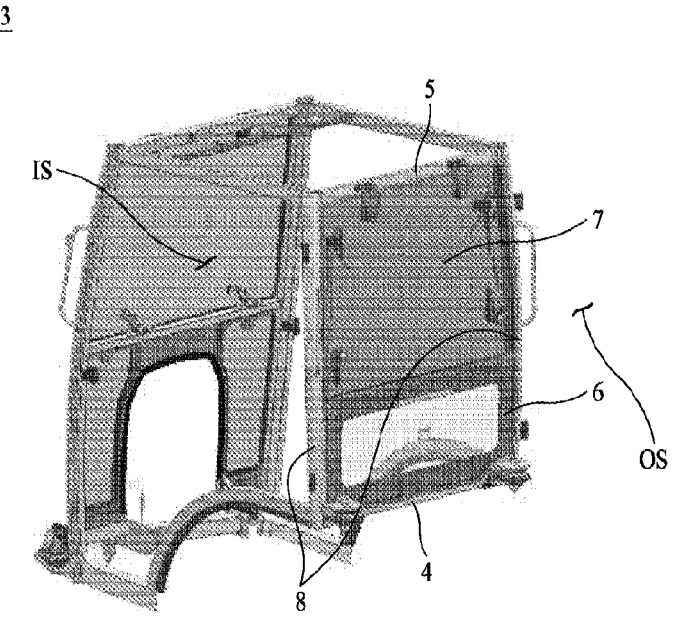
FIG. 2 is a schematic perspective view showing a cabin of the agricultural work vehicle.
Figure 3:
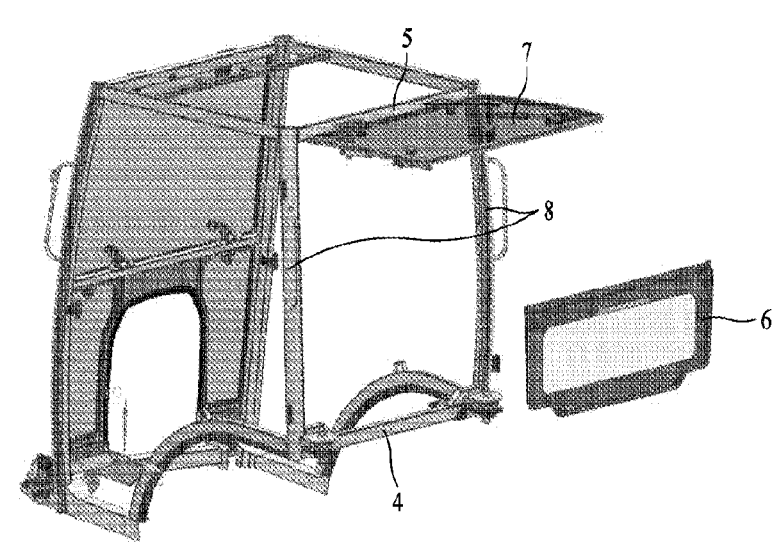
FIG. 3 is a schematic perspective view showing a state in which a cabin is open in the agricultural work vehicle according to the present disclosure.

Referring to FIGS. 1 to 3, the cabin 3 is coupled to the vehicle body 2, and is provided with the driver's seat 21 therein. The cabin 3 may be arranged to surround the driver's seat 21 in the front, rear, left, right, and top directions. In this case, an internal space IS in which the driver's seat 21 can be placed may be formed inside the cabin 3. An operator riding in the driver's seat 21 may be placed in the internal space IS. The cabin 3 may be implemented to separate the internal space IS from an external space OS that is located outside the vehicle body 2. Accordingly, the agricultural work vehicle 1 according to the present disclosure may protect an operator, located in the internal space IS, from changes in the external space OS through the cabin 3. For example, when the operator is located in the internal space IS, the operator may be protected from weather changes in the external space OS through the cabin 3.

Referring to FIGS. 1 to 3, the cabin 3 may include a lower frame 4 and an upper frame 5.

The lower frame 4 forms the lower part of the cabin 3 and may be coupled to the vehicle body 2. The lower frame 4 may be a frame constituting a part of the cabin 3. The lower frame 4 may be composed of a frame formed along the outer periphery of the lower end of the cabin 3.

The upper frame 5 forms the upper part of the cabin 3. The upper frame 5 may be a frame constituting a part of the cabin 3. The upper frame 5 may be provided above the lower frame 4. The upper frame 5 may be composed of a frame that supports the roof of the cabin.

Furthermore, in the present embodiment, the cabin 3 may further include at least one rear frame 8. The rear frame 8 may have one side coupled to the rear of the lower frame 4 and the other side coupled to the rear of the upper frame 5, and may include one or more rear frames.

Meanwhile, the upper frame 5, the lower frame 4, and the rear frame 8 may be formed of different members, respectively, or may be formed as an integrated piece.

Referring to FIGS. 1 to 4, the lower frame 4 may include a passage member 41 and connection members 42.

The passage member 41 is a part through which a part of an operator's body can protrude out of the cabin 3 beyond the top of the rear of the lower frame 4, and may be formed at the rear of the lower frame 4.

Furthermore, the connection members 42 are components that are coupled to both sides of the passage member 41. The rear portion of the lower frame 4 may be composed of the passage member 41 and the connection members 42 coupled to both sides of the passage member 41.

In this case, the passage member 41 may be formed at a lower height than the connection members 42. Accordingly, the agricultural work vehicle 1 according to the present disclosure may be implemented such that a part of an operator's body can protrude out of the cabin 3 beyond the top of the passage member 41 when the operator rides in the driver's seat 21 to be arranged toward the rear of the agricultural work vehicle 1 (in the direction of arrow BD) in order to operate the operation lever 22 (shown in FIG. 14). Accordingly, in the agricultural work vehicle 1 according to the present disclosure, the operator may ride in the driver's seat 21 in a more comfortable position through the passage member 41.

That is, in the agricultural work vehicle 1 according to the present disclosure, an operator may ride in the driver's seat 21 so that the operator is positioned toward the rear of the vehicle body 2 (in the direction of arrow BD) to operate the work machine 23 such as a backhoe. In this case, when the lower window 6 is open, the operator's lower body may protrude out of the cabin 3. Accordingly, the agricultural work vehicle 1 according to the present disclosure may be implemented such that the operator's lower body can easily protrude out of the cabin 3 through the passage member 41. Meanwhile, the passage member 41 may be recessed to a predetermined depth from the connection members 42. Accordingly, when the operator rides in the driver's seat 21 to face toward the rear of the vehicle body 2 (in the direction of arrow BD), there may be no interference with the movement of the operator's lower body. Accordingly, the agricultural work vehicle 1 according to the present disclosure allows the operator to use the work machine 23 while sitting in the driver's seat 21 in a more comfortable position.

The connection members 42 are coupled to both sides of the passage member 41. The connection members 42 may be coupled to both sides of the passage member 41 and connect the passage member 41 to other parts of the lower frame 4. The connection members 42 may be formed at a higher height than the passage member 41. In this case, the top surfaces of the connection members 42 may be arranged at a higher location than the top surface of the passage member 41.

Referring to FIGS. 1 to 6, the cabin 3 may include the lower window 6 and the upper window 7.

The lower window 6 is coupled to the rear of the lower frame 4. The lower window 6 may be openably coupled to the lower frame 4. More specifically, the lower window 6 may be selectively and detachably coupled to the rear of the lower frame 4. In this case, the lower window 6 may be coupled to the lower frame 4 to selectively open and close the rear of the lower frame 4 (the direction of arrow BD). In this case, the rear of the lower frame 4 (the direction of arrow BD) may refer to the rear of the vehicle body 2 (the direction of arrow BD). The lower window 6 may be detachably coupled to the lower frame 4 to open or close the rear portion of the lower frame 4.

The upper window 7 is coupled to the upper frame 5. The upper window 7 may be openably coupled to the upper frame 5. More specifically, the upper window 7 may be hinged and openably coupled to one side of the rear of the upper frame 5. In this case, the upper window 7 may be coupled to the upper frame 5 to selectively open and close the rear of the upper frame 5 (the direction of arrow BD). The upper window 7 may be rotatably coupled to the upper frame 5. In this case, one end of the upper window 7 may be coupled to the cabin 3 by hinges H. Accordingly, the upper window 7 may be rotatably moved around the hinges H. The upper window 7 may be implemented to be rotated in the upward direction UD around the hinges H in order to open the rear of the upper frame 5 (the direction of arrow BD) and also to be rotated in the downward direction DD in order to close the rear of the upper frame 5 (the direction of arrow BD). In this case, the upward direction UD may refer to the direction in which the upper window 7 moves away from the upper frame 5, and the downward direction DD may refer to the direction in which the upper window 7 approaches the upper frame 5.

The upper window 7 may be implemented such that, when the upper window 7 is opened while rotating around the hinges H, the other end of the upper window 7 may be spaced apart from the operation lever 22. The vehicle body 2 may include the work machine 23 installed at the rear of the vehicle body 2, and the operation lever 22 installed on the work machine 23 to operate the work machine 23.

Figure 14:
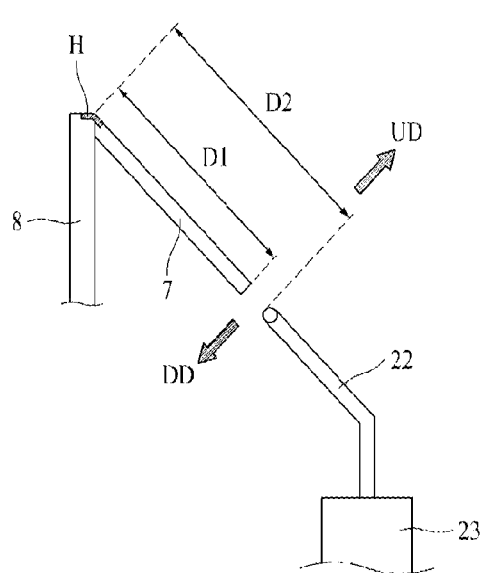
FIG. 14 is a schematic conceptual diagram showing a state in which the upper window is opened in the agricultural work vehicle according to the present disclosure.

In this case, as shown in FIG. 14, one end of the upper window 7 may be coupled to the cabin 3 by the hinges H, and the upper window 7 may be arranged such that the other end thereof does not interfere with the operation lever 22 during the process in which the upper window 7 is opened while rotating around the hinges H. More specifically, the distance D1 between the hinges H and the other end of the upper window 7 may be shorter than the distance D2 between the hinges H and the operation lever 22.

Accordingly, the agricultural work vehicle 1 according to the present disclosure may prevent the upper window 7 from interfering with the operation lever 22 during the process in which the upper window 7 is opened. The conventional case is implemented such that, since the upper window 7 interferes with the operation lever 22 during the process of opening the upper window 7, the upper window 7 is opened after the position of the operation lever 22 has been adjusted. In this case, the process of opening the upper window 7 is inconvenient, so that a problem arises in that it is difficult for an operator to rapidly open the upper window 7. However, in the agricultural work vehicle 1 according to the present disclosure, the upper window 7 does not interfere with the operation lever 22 during the process in which the upper window 7 is opened, the operation in which an operator opens the upper window 7 may be smoothly performed.

Figure 4:
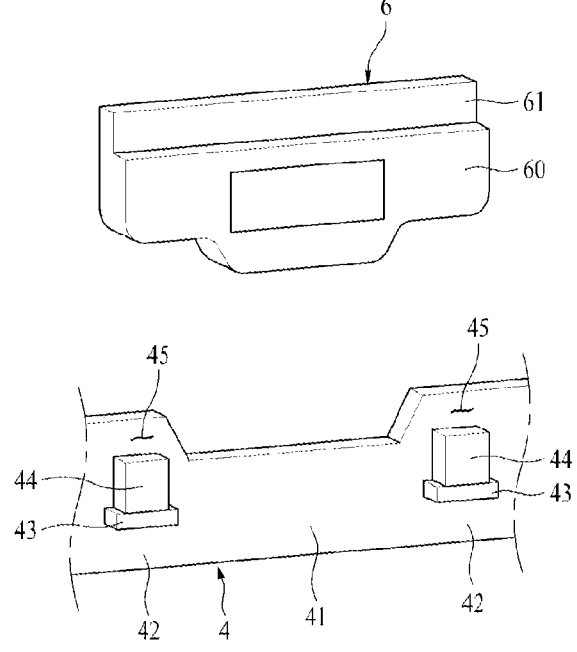
FIG. 4 is a schematic perspective view showing a state in which a lower window is coupled to a lower frame in the agricultural work vehicle according to the present disclosure.
Figure 5:
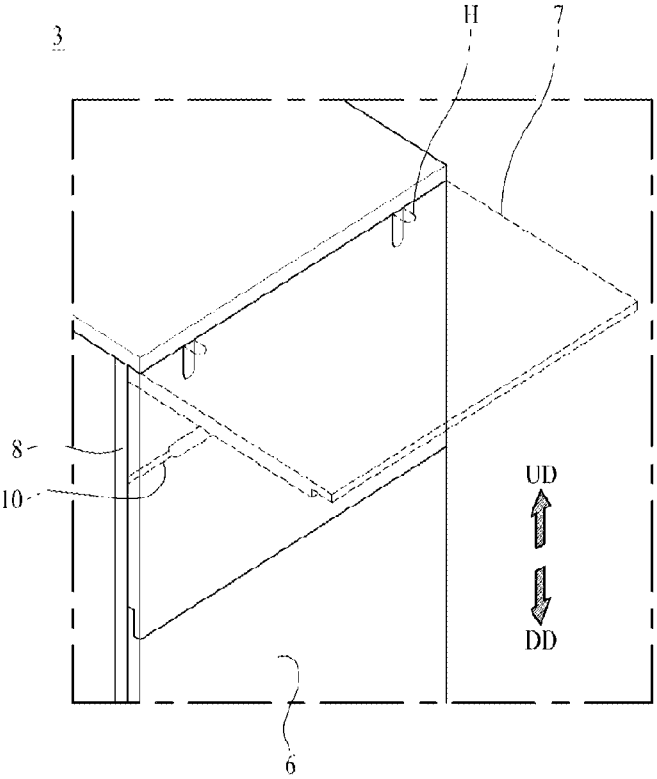
FIG. 5 is a schematic perspective view showing a state in which an upper window is moved upward in the agricultural work vehicle according to the present disclosure.
Figure 6:
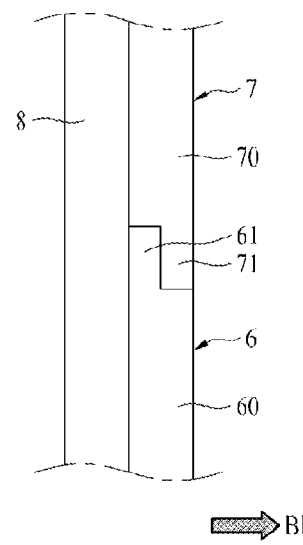
FIG. 6 is a conceptual diagram showing the upper window and the lower window are coupled to close the rear of the cabin in the agricultural work vehicle according to the present disclosure.
Figure 7:
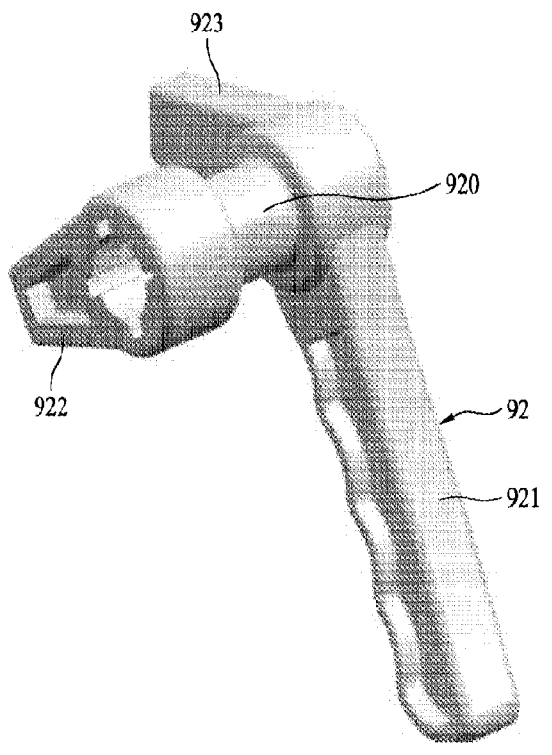
FIG. 7 is a schematic perspective view of an opening and closing part in the agricultural work vehicle according to the present disclosure.
Figure 8:
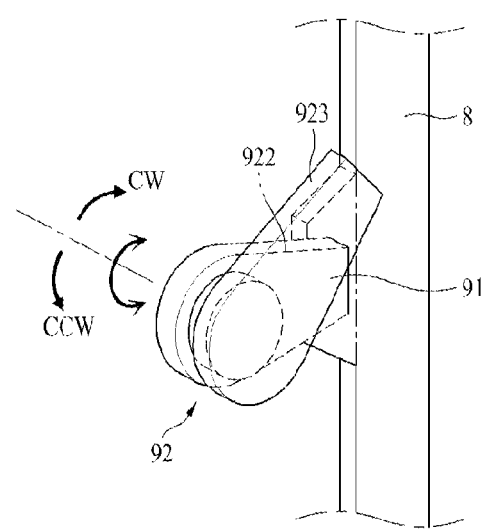
FIG. 8 is a schematic perspective view of an opening and closing device when the upper window is located in a closed position in the agricultural work vehicle according to the present disclosure.
Figure 9:
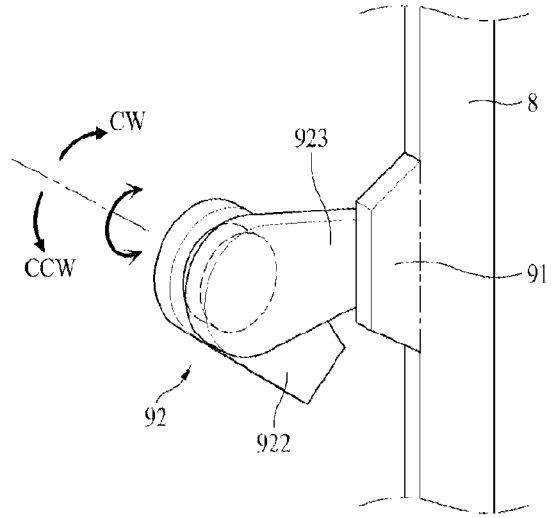
FIG. 9 is a schematic perspective view of the opening and closing device when the upper window is placed in a first partially open position in the agricultural work vehicle according to the present disclosure.

Meanwhile, referring to FIGS. 2 to 4, the lower frame 4 may include support members 43, coupling members 44, and coupling depressions 45.

The support members 43 are coupled to the connection members 42. The support members 43 may be formed to protrude from the connection members 42. In this case, the support members 43 may protrude toward the rear of the lower frame 4 (in the direction of arrow BD). That is, the support members 43 may protrude toward the rear of the vehicle body 2 (in the direction of arrow BD). The support members 43 may support the lower window 6 inserted into the coupling depressions 45. The support members 43 may restrain the lower window 6 from moving downward.

The coupling members 44 are arranged to be spaced apart from the connection members 42. The coupling members 44 may be coupled to the support members 43. The coupling members 44 may be formed to protrude from the support members 43. In this case, the coupling members 44 may protrude from the support members 43 to be arranged parallel to the connection members 42.

The coupling depressions 45 are formed between the coupling members 44 and the connection members 42. The lower window 6 may be inserted into the coupling depressions 45. Accordingly, in the agricultural work vehicle 1 according to the present disclosure, the lower window 6 may be coupled to the lower frame 4 through the coupling depressions 45 to come into close contact with the lower frame 4.

Meanwhile, in a modified example, separate depressions (not shown) are formed in the bottom surface of the lower window 6, so that the coupling members 44 can be inserted into the depressions in the bottom surface of the lower window 6 and the lower window 6 can come into close contact with the lower frame 4.

As described above, the lower window 6 may first be coupled to the lower frame 4, and then the upper window 7 may be coupled to the upper frame 5. Accordingly, the agricultural work vehicle 1 according to the present disclosure may be implemented such that the upper window 7 and the lower window 6 can close the rear of the cabin 3 (the direction of arrow BD). In this case, in the agricultural work vehicle 1 according to the present disclosure, the upper window 7 and the lower window 6 need to be in close contact with each other in order to completely close the internal space IS of the cabin 3. For this purpose, the upper window 7 may be implemented as follows.

Referring to FIGS. 1 to 6, the lower window 6 may include a lower window body 60 and a pressed member 61, and the upper window 7 may include an upper window body 70 and a pressing member 71.

The lower window body 60 is coupled to the lower frame 4. The lower window body 60 may be arranged to cover the rear of the lower frame 4 (the direction of arrow BD).

Accordingly, the lower window body 60 may be arranged to close the rear of the cabin 3 (the direction of arrow BD).

The pressed member 61 protrudes from the lower window body 60. The pressed member 61 may protrude toward the upper window 7. In this case, the pressed member 61 may protrude toward the upper window body 70.

The upper window body 70 is coupled to the upper frame 5. The upper window body 70 may be arranged to cover the rear of the upper frame 5 (the direction of arrow BD). Accordingly, the upper window body 70 may be arranged to close the rear of the cabin 3 (the direction of arrow BD).

The pressing member 71 protrudes from the upper window body 70. The pressing member 71 may protrude toward the lower window 6. In this case, the pressing member 71 may protrude toward the lower window body 60. One end of the pressing member 71 may protrude from the upper window body 70 to be arranged at a lower position than the lower end of the upper frame 5. In this case, the pressing member 71 may be arranged to be spaced apart from the lower frame 4. The pressed member 61 may be arranged between the pressing member 71 and the lower frame 4. Accordingly, in the agricultural work vehicle 1 according to the present disclosure, the pressed member 61 may be pressed toward the cabin 3 so that the upper window 7 and the lower window 6 can come into close contact with the cabin 3, that is, the upper frame 5, the lower frame 4, and the rear frame 8. Therefore, the agricultural work vehicle 1 according to the present disclosure may completely close the inside of the cabin 3 through the pressed member 61, thereby preventing cold air, and/or the like in the external space OS from entering. Accordingly, the agricultural work vehicle 1 according to the present disclosure may be implemented such that an operator can perform work without being affected by weather changes, so that the driving rate of the agricultural work vehicle 1 can be improved. As described above, the agricultural work vehicle 1 according to the present disclosure may be implemented such that the upper window 7 is closed after the lower window 6 has been coupled to the lower frame 4, so that the pressing member 71 can press the pressed member 61 in the direction toward the cabin 3. The upper window 7 and the lower window 6 may be arranged such that they can partially overlap each other.

Referring to FIGS. 1 to 6 and 8, the cabin 3 may include an opening and closing device 9.

The opening and closing device 9 is intended to open or close the upper window 7. The opening and closing device 9 may separate the external space OS and the internal space IS from each other by closing the upper window 7. Furthermore, the opening and closing device 9 may connect the external space OS and the internal space IS to each other by opening the upper window 7.

The opening and closing device 9 will be described in detail below with reference to the accompanying drawings.

Referring to FIGS. 1 to 7, the opening and closing device 9 may include a stop member 91 and an opening and closing part 92.

The stop member 91 is coupled to the rear frame 8 to protrude toward the upper window 7. The opening and closing part 92 is coupled to the upper window 7. The stop member 91 may be supported on the opening and closing part 92 so that the upper window 7 can be opened or closed. For example, the opening and closing part 92 is supported by the stop member 91 in the state in which the upper window 7 is closed, so that the upper window 7 can be fixed and come into close contact to the rear frame 8. In contrast, the opening and closing part 92 is supported by the stop member

91 in the state in which the upper window 7 is opened, so that the upper window 7 is restrained from moving toward the rear frame 8, thereby maintaining an open state.

Referring to FIGS. 1 to 9, the opening and closing part 92 may include an opening and closing body 920, an operating member 921, a closing member 922, and an opening member 923.

The opening and closing body 920 is coupled to the upper window 7. The opening and closing body 920 may be rotatably coupled to the upper window 7. The opening and closing part 92 may or may not be supported on the stop member 91 as the opening and closing body 920 is rotated.

The operating member 921 is operated by an operator. The opening and closing body 920 may be operated in such a manner that the operator operates the operating member 921. In this case, the opening and closing body 920 may be rotated together with the operating member 921 in the direction in which the operating member 921 is rotated. The operator may rotate the opening and closing part 92 clockwise CW or counterclockwise CCW by operating the operating member 921.

The closing member 922 is coupled to the opening and closing body 920. The closing member 922 may be formed to protrude from the opening and closing body 920. The closing member 922 may be supported on the stop member 91 so that the upper window 7 can be placed in a closed position CP where the upper window 7 comes into close contact with the rear frame 8.

Figure 10:
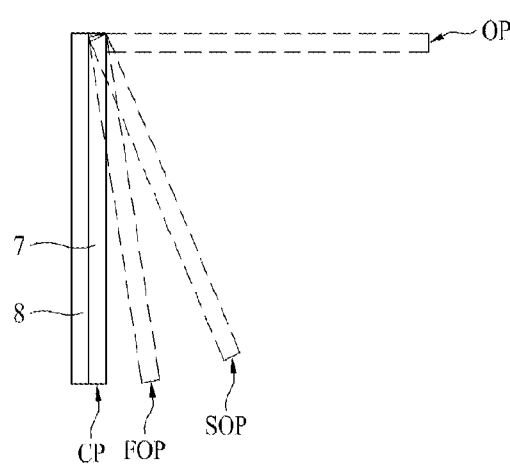
FIG. 10 is a conceptual diagram showing the closed position, the first partially open position, a second partially open position, and a fully open position in the agricultural work vehicle according to the present disclosure.
Figure 11:
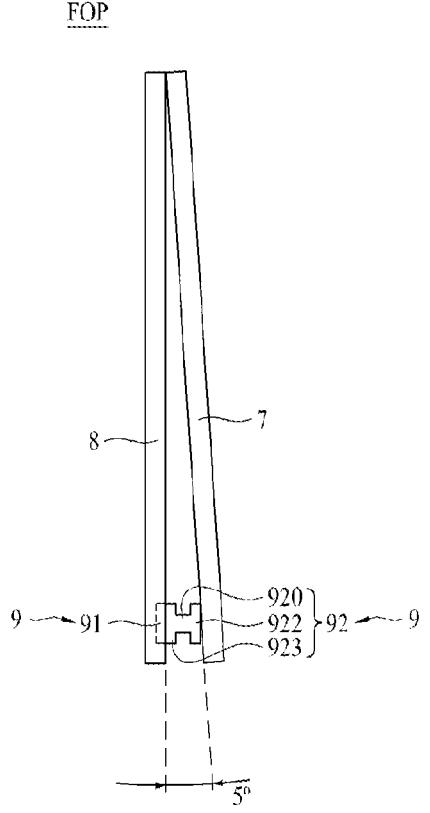
FIG. 11 is a conceptual diagram showing a state in which the upper window is placed in the first partially open position in the agricultural work vehicle according to the present disclosure.
Figure 12:
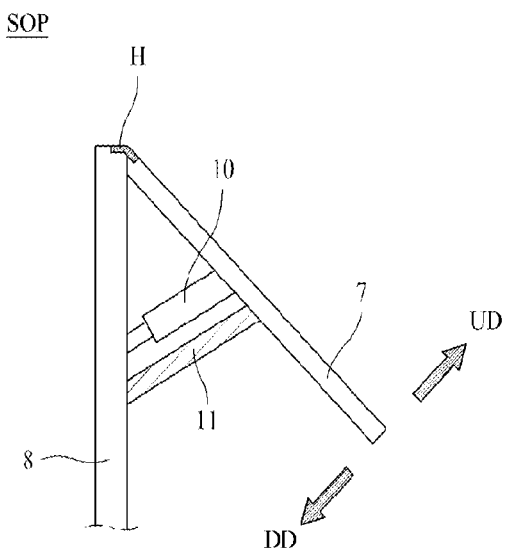
FIG. 12 is a conceptual diagram showing a state in which the upper window is placed in the second partially open position in the agricultural work vehicle according to the present disclosure.
Figure 13:
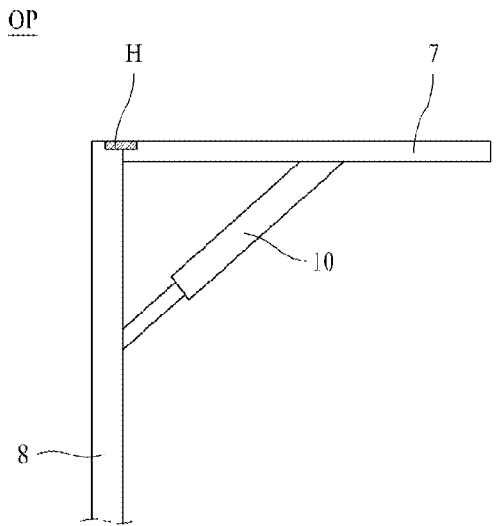
FIG. 13 is a conceptual diagram showing a state in which the upper window is placed in the fully open position in the agricultural work vehicle according to the present disclosure.

The opening member 923 is coupled to the opening and closing body 920. The opening member 923 may be formed to protrude from the opening and closing body 920. In this case, the open member 923 may be arranged to be spaced apart from the closing member 922. The opening member 923 may be supported on the stop member 91 so that the upper window 7 can be placed in a first partially open position spaced apart from the rear frame 8. In this case, the opening member 923 and the closing member 922 may extend in different directions from the central axis. Accordingly, the agricultural work vehicle 1 according to the present disclosure may be implemented to open or close the upper window 7 through the opening member 923 and the closing member 922. Furthermore, the opening member 923 and the closing member 922 may be arranged to be spaced apart from the upper window 7 by different distances, respectively. When the upper window 7 is placed in the closed position CP, the stop member 91 may be placed between the opening member 923 and the closing member 922. The stop member 91 may be placed such that the upper window 7 can be fixed in the closed position CP (shown in FIG. 10) by supporting the closing member 922. The closing member 922 may be spaced apart from the stop member 91 in such a manner that an operator rotates the operating member 921 clockwise CW. Accordingly, the upper window 7 may be spaced apart from the rear frame 8 and then opened.

Meanwhile, in the present embodiment, the above-described configuration of the stop member 91 of the opening and closing device 9 has been described as being provided on the rear frame 8. In contrast, in a modified example, the opening and closing part 92 is provided on the upper window 7 in a position adjacent to the lower window 6 and the stop member 91 is provided on the lower window 6, so that the opening and closing device 9 can be configured to directly fix the lower window 6 and the upper window 7.

Referring to FIGS. 1 to 5, the cabin 3 may include a gas spring 10.

The gas spring 10 is coupled to each of the upper window 7 and the rear frame 8. The gas spring 10 may be implemented to adjust the distance by which the upper window 7 is spaced apart from the rear frame 8. For example, when the included angle between the upper window 7 and the rear frame 8 is approximately 20° or less, the gas spring 10 may press the upper window 7 so that the upper window 7 can move toward the rear frame 8. Accordingly, the gas spring 10 may move the upper window 7 so that the upper window 7 can be closed. In contrast, when the included angle between the upper window 7 and the rear frame 8 is approximately 20° or more, the gas spring 10 may press the upper window 7 so that the upper window 7 can move to the side opposite to the rear frame 8. Accordingly, the gas spring 10 may move the upper window 7 so that the upper window 7 can be opened.

Referring to FIGS. 1 to 13, the agricultural work vehicle 1 according to the present disclosure may be implemented such that the upper window 7 can be placed in the closed position CP, the first partially open position FOP, a second partially open position SOP, and a fully open position OP through the opening and closing device 9, the gas spring 10, and an adjusting member 11. The closed position CP, the first partially open position FOP, the second partially open position SOP, and the fully open position OP will be described in detail below with reference to the accompanying drawings.

Referring to FIGS. 1 to 13, the upper window 7 may be placed in the closed position CP where the rear of the upper frame 5 and the rear frame 8 (the direction of arrow BD) is closed. As described above, the upper window 7 may be placed to be fixed in the closed position CP by the opening and closing device 9. Thereafter, an operator may open the rear of the cabin 3 (the direction of arrow BD) by operating the opening and closing device 9. In this case, division into the first partially open position FOP, the second partially open position SOP, and the fully open position OP may be made according to the degree to which the upper window 7 is opened.

Referring to FIGS. 1 to 13, the first partially open position FOP refers to the position in which the upper window 7 is placed such that the included angle between the upper window 7 and the upper frame 5 can be approximately 5 to 10 degrees. As described above, when an operator rotates the opening and closing part 92 clockwise CW and thus the closing member 922 is separated from the stop member 91, the upper window 7 may be moved in the upward direction UD. Thereafter, the operator may open the rear of the upper frame 5 and the rear frame 8 (the direction of arrow BD) by moving the upper window 7 in the upward direction UD. Meanwhile, the gas spring 10 may press the upper window 7 so that the upper window 7 can move toward the rear frame 8 (in the downward direction DD). Accordingly, when the operator removes the force moving the upper window 7 in the upward direction UD, the upper window 7 may be moved in the downward direction DD by the gas spring 10. In this case, the operator may support the opening member 923 on the stop member 91 by rotating the opening and closing part 92 again counterclockwise CCW, so that the upper window 7 that is pressed by the gas spring 10 and moved in the downward direction DD can be supported. Accordingly, the agricultural work vehicle 1 according to the present disclosure may be implemented to be placed in the first partially open position (FOP) where the upper window 7 is partially opened through the opening member 923.

Referring to FIGS. 1 to 13, the second partially open position SOP refers to the position in which the upper window 7 is placed such that the included angle between the upper window 7 and the upper frame 5 can be approximately 40° to 50°. In this case, the cabin 3 may include the adjusting member 11 to limit the degree to which the upper window 7 is opened. The adjusting member 11 is coupled to each of the upper window 7 and the rear frame 8. When the included angle between the upper window 7 and the rear frame 8 exceeds approximately 20°, the upper window 7 may be pressed by the gas spring 10 and moved in the upward direction UD. For example, the operator may move the upper window 7 in the upward direction UD by pressing the upper window 7 located in the first partially open position FOP. In this case, in the case where the included angle between the upper window 7 and the rear frame 8 exceeds approximately 20°, even when the operator removes the force pressing the upper window 7, the upper window 7 may be moved in the upward direction UD by the gas spring 10. Meanwhile, the adjusting member 11 may be coupled to each of the upper window 7 and the rear frame 8 and support the upper window 7 that moves in the upward direction UD. Accordingly, the agricultural work vehicle 1 according to the present disclosure may be implemented such that the upper window 7 can be placed in the second partially open position SOP where the upper window 7 is partially opened through the adjusting member 11. Accordingly, the agricultural work vehicle 1 according to the present disclosure may be implemented to adjust the position of the upper window 7 through the adjusting member 11. Therefore, the agricultural work vehicle 1 according to the present disclosure is implemented such that an operator can adjust the position of the upper window 7 as needed, so that the degree to which the cabin 3 is opened can be adjusted in accordance with weather changes in the external space OS. Meanwhile, the adjusting member 11 may be composed of a strap and a member. The adjusting member 11 may be detachably coupled to the cabin 3. That is, when the upper window 7 is placed in the second partially open position SOP, the adjusting member 11 may be coupled to the cabin 3. In contrast, when the upper window 7 is placed in the closed position CP, the first partially open position FOP, and the fully open position OP, the adjusting member 11 may be separated from the cabin 3.

The fully open position OP refers to the position in which the upper window 7 is placed such that the included angle between the upper window 7 and the rear frame 8 can be approximately 90° to 100°. When the adjusting member 11 is removed from the second partially open position SOP, the upper window 7 may be pressed by the gas spring 10 and moved in the upward direction UD. The upper window 7 moving in the upward direction UD may be supported by the hinges H, so that the included angle between the upper window 7 and the rear frame 8 can be approximately 90° to 100° and the upper frame 5 can be placed in the fully open position OP in which the rear portion of the upper frame 5 is fully opened. Accordingly, the agricultural work vehicle 1 according to the present disclosure may be implemented such that the rear of the cabin 3 (the direction of arrow BD) can be fully open, so that even when the external space OS is maintained at a high temperature, an operator located in the internal space IS can perform work. In addition, in the agricultural work vehicle 1 according to the present disclosure, the upper window 7 may serve as a sunshade for the operator.

The present disclosure described above is not limited to the above-described embodiments and the accompanying drawings. It will be apparent to those having ordinary skill in the art to which the present disclosure pertains that various substitutions, modifications, and changes may be made without departing from the technical spirit of the present disclosure.

The invention claimed is:

1. An agricultural work vehicle, comprising:
a vehicle body; and
a cabin coupled to the vehicle body, and provided with a driver's seat therein;
    wherein the cabin includes:
        a lower frame configured to form a lower part of the cabin;
        an upper frame configured to form an upper part of the cabin;
        a lower window selectively and detachably coupled to a rear of the lower frame, and configured to be selectively opened and closed; and
        an upper window hinged to a rear of the upper frame on one side thereof, and openably coupled to the upper frame,
    wherein:
        the lower window is coupled to the lower frame to close a rear portion of the lower frame; and
        the upper window closes a rear portion of the upper frame to partially overlap the lower window after the lower window has closed the rear portion of the lower frame.

2. The agricultural work vehicle of claim 1, wherein:
the cabin includes a rear frame configured such that one side thereof is coupled to the rear of the lower frame and a remaining side thereof is coupled to the rear of the upper frame, and an opening and closing device configured to open or close the upper window;
the opening and closing device includes a stop member coupled to the rear frame to protrude toward the upper window, and an opening and closing part coupled to the upper window; and
the opening and closing part is supported on the stop member so that the upper window can be opened or closed.

3. The agricultural work vehicle of claim 2, wherein:
the opening and closing part includes:
    an opening and closing body rotatably coupled to the upper window;
    a closing member configured to be supported on the stop member so that the upper window can be placed in a closed position where the upper window comes into close contact with the rear frame; and
    an opening member arranged to be spaced apart from the closing member, and configured to be supported on the stop member so that the upper window can be placed in a first partially open position where the upper window is spaced apart from the rear frame; and
the opening member and the closing member extend in different directions from the opening and closing body.

4. The agricultural work vehicle of claim 2, wherein:
the cabin includes a gas spring coupled to each of the rear frame and the upper window to adjust a distance by which the upper window is spaced from the rear frame; and
the opening and closing part is supported on the stop member, and thus supports the upper window that is pressed by the gas spring and moved toward the rear frame.

5. The agricultural work vehicle of claim 1, wherein the cabin includes:

a rear frame configured such that one side thereof is coupled to the rear of the lower frame and a remaining side thereof is coupled to the rear of the upper frame;
a gas spring coupled to each of the rear frame and the upper window to adjust a distance by which the upper window is spaced from the rear frame; and
an adjusting member coupled to each of the upper window and the rear frame.

6. The agricultural work vehicle of claim 1, wherein:
the cabin includes a rear frame configured such that one side thereof is coupled to the rear of the lower frame and a remaining side thereof is coupled to the rear of the upper frame, and a gas spring coupled to each of the rear frame and the upper window to adjust a distance by which the upper window is spaced from the rear frame; and
the upper window is pressed by the gas spring and is placed in a fully open position where the rear portion of the upper frame is fully opened.

7. The agricultural work vehicle of claim 1, wherein:
the vehicle body includes a work machine installed at a rear of the vehicle body, and an operation lever installed on the work machine to operate the work machine;
one end of the upper window is coupled to the cabin by a hinge; and
the upper window is arranged such that a remaining end of the upper window does not interfere with the operation lever during a process in which the upper window is opened while rotating around the hinge.

8. The agricultural work vehicle of claim 1, wherein:
the upper window includes a pressing member that protrudes toward the lower window;
the lower window includes a pressed member that protrudes toward the upper window; and
the pressing member presses the pressed member toward the cabin so that the upper window and the lower window can come into close contact with the cabin.

9. The agricultural work vehicle of claim 1, wherein:
the lower frame includes a passage member configured such that a part of an operator's body can protrude out of the cabin beyond a top of the rear of the lower frame therethrough, and connection members coupled to both sides of the passage member; and
the passage member is formed at a lower height than the connection members.

10. The agricultural work vehicle of claim 9, wherein:
the lower frame includes support members coupled to the connection members, and coupling members arranged to be spaced apart from the connection members; and
the lower window is inserted into coupling depressions formed between the coupling members and the connection members and comes into close contact with the lower frame.

11. An agricultural work vehicle, comprising:
a vehicle body; and
a cabin coupled to the vehicle body, and provided with a driver's seat therein;
    wherein the cabin includes:
        a lower frame configured to form a lower part of the cabin;
        an upper frame configured to form an upper part of the cabin;
        a lower window selectively and detachably coupled to a rear of the lower frame, and configured to be selectively opened and closed; and an upper window hinged to a rear of the upper frame on one side thereof, and openably coupled to the upper frame, wherein:

the cabin includes a rear frame configured such that one side thereof is coupled to the rear of the lower frame and a remaining side thereof is coupled to the rear of the upper frame, and an opening and closing device configured to open or close the upper window, the opening and closing device includes a stop member coupled to the rear frame to protrude toward the upper window, and an opening and closing part coupled to the upper window; and the opening and closing part is supported on the stop member so that the upper window can be opened or closed.

12. An agricultural work vehicle, comprising:

a vehicle body; and a cabin coupled to the vehicle body, and provided with a driver's seat therein;

wherein the cabin includes:

a lower frame configured to form a lower part of the cabin;

an upper frame configured to form an upper part of the cabin;

a lower window selectively and detachably coupled to a rear of the lower frame, and configured to be selectively opened and closed; and an upper window hinged to a rear of the upper frame on one side thereof, and openably coupled to the upper frame, wherein:

the lower frame includes a passage member configured such that a part of an operator's body can protrude out of the cabin beyond a top of the rear of the lower frame therethrough, and connection members coupled to both sides of the passage member; and the passage member is formed at a lower height than the connection members.

* * * * *